United States Patent Office 3,594,117
Patented July 20, 1971

1

3,594,117
PROCESS FOR REMOVING CERIUM AND THORIUM FROM THE OTHER RARE EARTH METALS
Vincent Chiola and George J. Kamin, Towanda, Pa., assignors to Sylvania Electric Products Inc.
No Drawing. Filed Oct. 30, 1968, Ser. No. 772,030
Int. Cl. C22b 59/00; C01f 17/00
U.S. Cl. 23—22                                10 Claims

ABSTRACT OF THE DISCLOSURE

A process for separating impurities selected from the group consisting of cerium, thorium and mixtures thereof from an impure material useful for cathodoluminescent phosphor production is disclosed, the process comprising a dissolution of said impure material in a mineral acid, oxidizing said impurities, forming the insoluble iodates of said impurities and removing the impurities as solid iodates from the solution containing the purified luminescent materials.

BACKGROUND OF THE INVENTION

This invention relates to the purification of materials useful in cathodoluminescent phosphors. More particularly, it pertains to a method for purifying the materials containing the rare-earth and yttrium chemicals that are used in the manufacture of the new "rare-earth" phosphors.

It is generally known that the brightness level of luminescent materials is dependent upon the purity of the starting materials used in their preparation. The newer rare-earth-containing phosphors, useful as red-emitting phosphors, as for example, the class exemplified by yttrium orthovanadate-europium activated, gadolinium oxide-europium activated, yttrium oxide-europium activated and yttrium oxysulfide-europium activated, while extremely bright phosphors, are also influenced by the presence of impurities.

It is to be noted that as used herein, the rare earth phosphors include those phosphor materials of the lanthanide series and yttrium since in cathodluminescent uses yttrium behaves similar to the other rare earths of lanthanide series other than cerium.

Luminescent characteristics of the rare-earth phosphors are known to be sensitive to the presence of other rare-earth elements. In the case of the newer yttrium-based, red-emitting phosphors, cerium of the lanthanide series is known to be a particularly detrimental rare-earth impurity. Another undersirable element, although not part of the lanthanide series, is thorium.

It is necessary that starting materials for rare-earth phosphors contain low levels of cerium and thorium, preferably less than 25 p.p.m. cerium or thorium to achieve an acceptable degree of brightness. Starting materials, such as yttrium oxide, gadolinium oxide and europium oxide, that meet these requirements, are generally not available in commercial quantities at reasonable cost, therefore, it is necessary to purify the available raw materials.

A number of methods are known and have been used for the separation of cerium and thorium from other rare-earth of the lanthanide series. Cerium and thorium can be separated from rare earths by ion exchange techniques involving the use of organic chelating agents, such as citric acid, ethylenediamine tetraacetic acid, diethylenetriaminepentaacetic acid or nitrilotriacetic acid. The rare earths are charged onto anion exchange column,

2 and eluted with organic reagent until bonding occurs and the desired materials containing the rare earth elements are selectively separated from the impurities.

It is also known that cerium and thorium can be separated from the rare earths by solvent extraction using various organophosphorus compounds or amines. The rare-earth solutions are contacted with an immiscible organic phase containing the extracting agent, either to extract the desired rare earth, i.e. yttrium, from the cerium and thorium or to extract the cerium and thorium from the rare earth.

The most generally used method for removing cerium and thorium from rare earths is the selective precipitation of ceric and thorium hydroxides from an acid solution of the rare-earth salt. The cerium and thorium are oxidized to their tetravalent states with a strong oxidant, such as persulfate ion, and then precipitated as hydroxides by adjustment of the pH.

Each of the above methods has certain disadvantages. The column ion exchange methods are slow and expensive, especially if barrier-ion cations, such as $Zn^{+++}$ or $Fe^{+++}$ are used to effect better separations. The solvent extraction methods require elaborate equipment which is often uneconomical to use on a batch basis and can be especially expensive when the desired rare earth must be extracted away from minor amounts of impurities. Often solvent extraction methods require the use of dilute rare-earth solutions which adds to the cost of the process. Both ion exchange and solvent extraction demand very close process control of a number of operating conditions such as pH, oragnic concentrations, rare-earth concentrations, and flow rates.

The hydroxide precipitation process for purification is difficult to control. Usually close pH control at elevated temperature is required for effective hydroxide precipitation. This is an inherently difficult control to accomplish. Because of the difficulty in optimizing the condition of the precipitation, recovery of rare-earth salts ranges unpredictably from 60–95% on a batch to bathc basis and the method is dependent upon the skill of the operator. Likewise, the process generates large amounts of cerium and thorium-containing sludge which must be reworked to recover rare-earth values in order to make the process economically feasible.

It is believed, therefore, that a process that is readily controlled, that is reproducible with high yields, is relatively independent of operator variations and achieves low levels of cerium and thorium in the purified product is an advancement in the art.

SUMMARY OF THE INVENTION

In accordance with one aspect of the present invention materials useful for the production of cathodoluminescent phosphors containing cerium, thorium or mixtures threeof, can be purified to a level which is suitable for the preparation of high brightness phosphors by a process that involves the selective precipitation of cerium and thorium iodates from an acidic solution having a controlled pH. The cerium and thorium content of rare-earth chemicals, for example, yttrium oxide and europium oxide, can be reduced to levels of less than 25 p.p.m. by the iodate precipitation process of the present invention. Additionally, the process comprising removal of cerium and thorium from rare-earth solutions by selective iodate precipitation, recovery of the rare earth from the solution as oxide or oxalate, and use of the rare earth to prepare phosphors, results in commercially acceptable high-brightness phosphors.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

The impure material containing, as an impurity, minor amounts of impurities selected from the group consisting of cerium, thorium and mixtures thereof is dissolved in a mineral acid such as nitric acid, the pH is adjusted, the impurities present are oxidized and an excess of iodate ions are added to the solution. The pH of the solution is thereafter adjusted from about 4.0 to about 5.5 with a suitable basic material. A small amount of the desired rare earth iodates and hydroxides are formed and precipitate from the solution. However, the iodates of the impurities are formed and are precipitated with the rare-earth hydroxide and iodate precipitate e.g. yttrium hydroxide and yttrium iodate, resulting in an effective removal of essentially all of the cerium and thorium impurities. After classification and removal of the precipitate by filtration, the purified rare earths are recovered from the filtrate by any conventional means, such as oxalate or hydroxide precipitation. Yields of rare earths are relatively high, generally above about 95% when yttrium is the rare earth source that is purified.

There are a number of embodiments in the process which can be used. For example, the common mineral acids such as nitric, sulfuric and the like, can be used for dissolution of the rare earths; the only requirement being that the rare earths are soluble at least to the extent of 1% by weight at 25° C.

Any common base or alkaline salt, such as the ammonium or alkali metal hydroxide, the ammonium or alkali metal carbonates, can be used for pH adjustment. Of these, ammonium and sodium hydroxides and carbonates are preferred. Any convenient source of iodate ion, such as potassium iodate, sodium iodate or iodic acid can be used as the iodate source, with potassium iodate being preferred. The pH of the final precipitation can be varied from about 4.0 to about 5.5, though the preferred range is from about 4.2 to about 4.4.

The iodate concentration is not critical, however, concentrations above the equivalent of about 1.0 g. $KIO_3$/l. of rare-earth solution are preferred. An iodate concentration of from about 2 to about 8 g. $KIO_3$/l. of rare-earth solution containing from about 60 to about 120 g. of rare-earth oxide per liter is especially preferred. The hydrogen peroxide concentration is effective at concentrations above 1.0 ml. 30% hydrogen peroxide/liter of rare-earth solution. The preferred range of 30% hydrogen peroxide concentration is from about 2 to about 8 ml. 30% $H_2O_2$/liter of rare-earth solution. The concentration of the rare earth in solution is not seemingly critical although concentrations of from about 60 to about 120 g. rare-earth oxide-liter of solution are preferred.

The method is effective in removing the cerium and thorium content from rare-earth oxides containing relatively minor amounts of cerium and thorium such as about 1100 p.p.m. cerium and 1000 p.p.m. thorium, although the process can be used to remove larger amounts if desired. In most instances, the impure materials subjected to the process of this invention will contain less than 1000 p.p.m. of cerium and less than 1000 p.p.m. of thorium.

It has been found that in weakly acidic solutions containing cerium and thorium, the ceric and thorium iodates do not precipitate. The limited solubility of these salts keeps them in a supersaturated condition. The precipitation of these salts is achieved by forming a "carrier" to assist in their precipitation. By controlled pH adjustment rare-earth hydroxides and iodates are formed which provide the "carrier" and thus enables the ceric and thorium iodates to precipitate from the solution.

For even a better understanding of the invention, the following detailed examples are presented. All parts, percentages and proportions are by weight unless otherwise indicated.

Example I 75 parts of $Y_2O_3$ containing about 360 p.p.m. of cerium and a detectable amount of thorium are dissolved in a 10% by volume aqueous solution of nitric acid. The pH of the solution is adjusted to about 3 with a 10% by volume aqueous solution of ammonium hydroxide. 10 parts by volume of a 30% hydrogen peroxide solution and 10 parts by weight of potassium iodate, dissolved in 100 parts of deionized water are added with agitation of the solution. The pH of the mixture is adjusted to about 4.2 with a 10% ammonium hydroxide solution and agitation is continued for one hour. A precipitate is formed and is removed by vacuum filtration. The yttrium content of the filtrate is recovered by precipitation by the addition of a hot 10% oxalic acid solution. The yttrium oxalate is washed by decantation until the wash solution is neutral and then is fired at 900° C. for two hours, resulting in the conversion to the oxide. The final product contains <25 p.p.m. cerium and <25 p.p.m. thorium. Spectographic analysis of the fraction precipitated as impurities show >1% cerium and >0.1% thorium, indicating that a major portion of cerium and thorium has been precipitated. Recovery of the yttrium oxide is about 98.5%.

Example II 7.5 parts of yttrium oxide containing about 335 p.p.m. of cerium and a detectable amount of thorium is dissolved in a 10% by volume of a 10% nitric acid solution and is treated with about 100 parts of a 30% hydrogen peroxide solution and about 125 parts by weight solution of potassium iodate by the following procedure. The pH of the yttrium nitrate solution is adjusted to about 3, and the peroxide and solid iodate are added. The solution is agitated and the pH is adjusted to about 4.3 with a 10% ammonium hydroxide solution. Agitation is continued for about one hour, the precipitate is removed by filtration, and the yttrium is recovered from the filtrate by precipitation with a hot 10% oxalic acid solution. The yttrium oxalate is washed by decantation and is fired to the oxide.

The final product contains less than 25 p.p.m. cerium and less than 25 p.p.m. thorium. Spectrographic analysis of a sample of the fraction precipitated as impurities shows greater than 0.05% (500 p.p.m.) cerium and greater than 0.05% (500 p.p.m.) thorium. The yield of purified yttrium oxide is about 95.0%. The original oxide and final product are both used to prepare a yttrium vanadate-europium-activated phosphor using conventional preparatory methods. The phosphor produced from the purified product shows a 9% increase in brightness, compared to phosphor prepared from the starting material.

Example III

About 100 parts by weight of yttrium oxide containing 1100 p.p.m. cerium and a detectable amount of thorium is dissolved in a 10% nitric acid solution. The pH is adjusted to about 3 with ammonium hydroxide. About 10 parts by volume of a 30% hydrogen peroxide solution is added and about 15 parts of potassium iodate is dissolved in 200 parts of deionized water and iodate solution is added. The pH of the mixture is adjusted to about 4.3 with a 10% ammonium hydroxide solution and the mixture is agitated for about one hour. The precipitate is removed by filtration and the yttrium values are recovered from the filtrate by precipitation with a hot oxalic acid solution. The yttrium oxalate is washed by decantation and is fired to the oxide at about 900° C.

A sample of the final product shows less than 25 p.p.m. cerium and less than 25 p.p.m. thorium. The process shows a 95.7% recovery of purified yttrium oxide. Yttrium vanadate-europium-activated phosphors are prepared from the starting material and the final product, using conventional preparatory methods. The phosphor produced from the purified product is about 51% brighter than the phosphor prepared from the starting material.

EXAMPLE IV

About 50 parts by weight of europium oxide containing 382 p.p.m. cerium and 65 p.p.m. thorium is dissolved in a 10% aqueous nitric acid solution. The pH of the solution is adjusted to about 3 with an ammonium hydroxide solution and 5 parts of potassium iodate dissolved in 100 parts by volume of deionized water and 10 parts of a 30% hydrogen peroxide solution are added to the solution with agitation. The pH is adjusted to about 4.3 with a 10% ammonium hydroxide solution and the solution is agitated for about one hour. The precipitate is removed by filtration and the europium is recovered from the filtrate by precipitation with a hot oxalic acid solution. The europium oxalate is washed by decantation until the wash solution is neutral and then is fired to the oxide at about 900° C.

A sample of the purified product analyzes less than about 25 p.p.m. cerium and less than about 25 p.p.m. thourium. The yield of purified europium oxide is about 95.8%.

EXAMPLE V

About 2' parts by weight gadolinium oxide containing 290 p.p.m. cerium is dissolved in 10% aqueous nitric acid solution. The pH of the solution is adjusted to about 3 with an ammonium hydroxide solution and 2 parts of potassium iodate dissolved in 75 parts by volume of deionized water and 5 parts of a 30% hydrogen peroxide solution are added to the solution with agitation. The pH is adjusted to about 4.3 with a 10% ammonium hydroxide solution and the solution is agitated for one hour. The precipitate is removed by filtration and the gadolinium is recovered from the filtrate by precipitation with a hot oxalic acid solution. The gadolinium oxalate is washed by decantation until the wash solution is neutral and then is fired to the oxide at about 900° C.

A sample of the purified product analyzes less than about 25 p.p.m. cerium. The yield of purified gadolinium oxide is about 99.3%.

While there has been shown and described what is at present considered the preferred embodiments of the invention, it will be obvious to those skilled in the art that various changes and modifications may be made therein without departing from the scope of the invention as defined by the appended claims.

We claim:
1. A process for separating an impurity selected from the group consisting of cerium, thorium and mixtures thereof from an impure material useful for cathodoluminescent phosphor production selected from the group consisting of sources containing the other rare earths of the lanthanide series, yttrium and mixtures thereof, said process comprising:
 (a) dissolving said impure material in a mineral acid to thereby form an acidic solution;
 (b) adjusting the pH of said solution to a value of from about 2.5 to about 3.5;
 (c) adding a sufficient amount of an oxidant to said solution to oxidize the impurities;
 (d) adding to said solution a sufficient amount of an iodate source to yield an amount of iodate ions in excess of the amount theoretically required to react with said impurities;
 (e) adjusting the pH of the solution to a value of from about 4.0 to about 5.5; and
 (f) removing, as a solid, a major proportion of said impurities to thereby form a solution that contains less than about 25 p.p.m. of cerium or thorium based upon the amount of phosphor producing materials.
2. A process according to claim 1 wherein said source contains a member selected from the group consisting of yttrium, europium and gadolinium.
3. A process according to claim 2 wherein said member is yttrium.
4. A process according to claim 2 wherein said member is gadolinium.
5. A process according to claim 2 wherein said member is europium.
6. A process according to claim 2 wherein said impurity is cerium.
7. A process according to claim 6 wherein said mineral acid is nitric acid.
8. A process according to claim 7 wherein said oxidant is hydrogen peroxide.
9. A process according to claim 8 wherein ammonium hydroxide is used to adjust the pH.
10. A process according to claim 9 wherein the iodate source is potassium iodate.

References Cited

UNITED STATES PATENTS 3,146,063  8/1964  Moore et al. _____ 23—19X

OTHER REFERENCES

Butler et al., "Industrial & Engineering Chemistry," vol. 53, August 1961, pp. 651–654.

HERBERT T. CARTER, Primary Examiner

U.S. Cl. X.R.

23—23, 24, 85, 345; 252—301.4

PO-1050
(5/69)

UNITED STATES PATENT OFFICE
CERTIFICATE OF CORRECTION

Patent No. 3,594,117     Dated July 20, 1971

Inventor(s) Vincent Chiola and George J. Kamin

It is certified that error appears in the above-identified patent and that said Letters Patent are hereby corrected as shown below:

Column 5, line 27 of the specification "2'" should read -- 25 --.

Signed and sealed this 7th day of December 1971.

(SEAL)
Attest:

EDWARD M. FLETCHER, JR.  ROBERT GOTTSCHALK
Attesting Officer        Acting Commissioner of Patents